(12) United States Patent
Guichard et al.

(10) Patent No.: US 8,520,672 B2
(45) Date of Patent: Aug. 27, 2013

(54) PACKET SWITCHING DEVICE USING RESULTS DETERMINED BY AN APPLICATION NODE

(75) Inventors: Jim Guichard, New Boston, NH (US); David Delano Ward, Somerset, WI (US); Cedell Adam Alexander, Jr., Durham, NC (US); Brian Lance Hiltscher, Cary, NC (US); Doron Oz, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 428 days.

(21) Appl. No.: 12/846,796

(22) Filed: Jul. 29, 2010

(65) Prior Publication Data

US 2012/0026897 A1 Feb. 2, 2012

(51) Int. Cl.
*H04L 12/56* (2011.01)
(52) U.S. Cl.
USPC .......................................... 370/389; 709/224
(58) Field of Classification Search
None
See application file for complete search history.

(56) References Cited

U.S. PATENT DOCUMENTS

| 7,860,100 | B2 | 12/2010 | Khalid et al. |
| 8,345,682 | B2 | 1/2013 | Pignataro et al. |
| 2007/0237147 | A1 | 10/2007 | Quinn et al. |
| 2008/0177896 | A1* | 7/2008 | Quinn et al. ................... 709/238 |
| 2008/0198849 | A1 | 8/2008 | Guichard et al. |
| 2008/0291923 | A1* | 11/2008 | Back et al. ..................... 370/396 |
| 2008/0320303 | A1 | 12/2008 | Khalid et al. |
| 2009/0037713 | A1 | 2/2009 | Khalid et al. |
| 2010/0058329 | A1 | 3/2010 | Durazzo et al. |
| 2010/0132031 | A1* | 5/2010 | Zheng ............................... 726/13 |
| 2010/0158009 | A1* | 6/2010 | Lee et al. ......................... 370/392 |
| 2010/0165985 | A1 | 7/2010 | Sharma et al. |
| 2010/0254385 | A1 | 10/2010 | Sharma et al. |
| 2012/0002672 | A1 | 1/2012 | Alexander, Jr. et al. |
| 2012/0027016 | A1 | 2/2012 | Filsfils et al. |
| 2012/0033663 | A1 | 2/2012 | Guichard et al. |
| 2012/0033664 | A1 | 2/2012 | Pignataro et al. |

* cited by examiner

*Primary Examiner* — Chi Pham
*Assistant Examiner* — Mohammad Adhami
(74) *Attorney, Agent, or Firm* — The Law Office of Kirk D. Williams (57) ABSTRACT

Packets are encapsulated and sent from a service node (e.g., packet switching device) using one or more services applied to a packet by an application node (e.g., a packet switching device and/or computing platform such as a Cisco ASR 1000) to generate a result, which is used by the service node to process packets of a flow of packets to which the packet belonged. An example of a service applied to a packet is a classification service, such as, but not limited to, using deep packet inspection on the packet to identify a classification result. The service node can, for example, use this classification result to process other packets in a same packet flow, such that all packets of a flow do not need to be, nor typically are, sent to an application node for processing.

10 Claims, 6 Drawing Sheets

SERVICE DEFINITION AT
APPLICATION NODE
350

```
351 → ServiceWire    <service-name>
  352 → description    <text>
  353 → service-id     <service-id>
  354 → input          <input-service-interface>
  355 → output         <output-service-interface>
  356 → ((nexthop      <ip-address>
                       ([optimize-l2] | [rewrite-service-id <service-id>])
                       [export-qos-group]) |
  357 → lasthop        [<ip-address>])
```

FIGURE 3B

SERVICEWIRE
RESPONSE
PACKET
380

| | |
|---|---|
| 381 | INFORMATION TO GET RESPONSE PACKET FROM APPLICATION NODE TO NEXT APPLICATION NODE OR SERVICE NODE (E.G., MPLS, ETHERNET, GRE, HDLC, PPP PACKET) |
| 382 | SERVICEWIRE ENCAPSULATION (E.G, HEADER WITH FIRST NIBBLE AS ZERO, AND TLVS SUCH AS: CLASSIFICATION OR OTHER PROCESSING RESULT, SERVICE ID TLV, VPN TLV, PARAMETERS TLV DEFINING SPECIFIC SERVICE FROM THE GENERAL SERVICE CORRESPONDING TO THE SERVICE ID) |
| 383 | SERVICES-APPLIED PACKET (E.G., IP PACKET) |

FIGURE 3C

PACKET SWITCHING DEVICE USING RESULTS DETERMINED BY AN APPLICATION NODE

TECHNICAL FIELD

The present disclosure relates generally to communicating information in a network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Layer-4 to layer-7 services are often applied to packets being sent through a packet switching device. Service Insertion Architecture teaches one approach to providing network services outside the packet switching device.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with a service node (e.g., packet switching device) using one or more services applied to a packet by an application node (e.g., a packet switching device and/or computing platform such as a Cisco ASR 1000) to generate a result, which is used by the service node to process packets of a flow of packets to which the packet belonged. In one embodiment, a service applied to a packet is a classification service, such as, but not limited to, using deep packet inspection on the packet to identify a classification result. In one embodiment, the service node uses this classification result to process the packet. In one embodiment, the service node uses this classification result to process the packet and/or other packets in a same packet flow, such that all packets of a flow do not need to be sent to an application node for processing. In one embodiment, multiple packets of a packet flow are sent to an application node(s) for processing, such as, but not limited to, using deep packet inspection to identify one or more classification results which are used to process one or more packets in the packet flow.

One embodiment includes a method, comprising: creating, by a packet switching device, a request packet corresponding to a particular packet of a flow of packets, with the flow of packets including: a particular packet and a plurality of other packets; sending, by the packet switching device, the request packet to an application node of one or more application nodes remote from the packet switching device; applying one or more services, by said one or more application nodes, to the particular packet to generate a particular result; receiving, by the packet switching device, a response packet including the particular result, with the response packet corresponding to said sent request packet; and processing, by the packet switching device, the particular packet and each of the plurality of other packets according to the particular result, without the plurality of other packets being sent to one or more application nodes prior to said processing of the plurality of other packets.

In one embodiment, said one or more services includes a classification operation using deep packet inspection of the particular packet to produce a classification result; and wherein the particular result includes the classification result. In one embodiment, said deep packet inspection includes analyzing the payload of the particular packet. In one embodiment, said deep packet inspection includes analyzing information extracted from the packet corresponding to at least one or more of Open System Interconnect (OSI) layers from the group consisting of layer 5, layer 6 and layer 7.

In one embodiment, the packet switching device performs operations, including: creating, by a packet switching device, a request packet corresponding to a particular packet, with the request packet including the particular packet; sending, by the packet switching device, the request packet to one or more application nodes external to the packet switching device to perform a classification operation on the particular packet to produce a classification result; receiving, by the packet switching device, a response packet including the classification result; and processing by the packet switching device, the particular packet based on the classification result.

In one embodiment, the classification operation relies on deep packet inspection of the particular packet. One embodiment includes: performing, by one or more application nodes the classification operation using deep packet inspection including analyzing the payload of the particular packet. In one embodiment, said deep packet inspection includes analyzing information extracted from the packet corresponding to at least one or more of Open System Interconnect (OSI) layers from the group consisting of layer 5, layer 6 and layer 7. In one embodiment, the classification result identifies a particular Quality of Service (QoS). In one embodiment, the classification result identifies a particular Quality of Service (QoS); wherein the particular packet is a packet in a flow of packets; and wherein the method includes: processing a plurality of other packets in the flow of packets according to the particular QoS; wherein the plurality of other packets are not forwarded to said one or more application nodes prior to said processing of the plurality of other packets. In one embodiment, the response packet includes the particular packet which is said processed based on the classification result. In one embodiment, the request packet includes a service identification of at least one service of one or more services to be applied to the particular packet by one or more application nodes.

In one embodiment, the particular packet is a packet in a flow of packets; and wherein the method includes: processing a plurality of other packets in the flow of packets based on the classification result. One embodiment includes: receiving, by the packet switching device, the particular packet from a device external to the packet switching device. One embodiment includes: determining to forward the particular packet of a flow of packets to said one or more application nodes; wherein the flow of packets includes the particular packet and a plurality of other packets. In one embodiment, the classification result identifies a particular Quality of Service (QoS); and wherein the method includes: determining for each specific packet of the plurality of other packets, not to forward to said specific packet to one or more application nodes; and processing said specific packet based on the particular QoS.

2. Description

Disclosed are, inter alia, methods, apparatus, computer-storage media, mechanisms, and means associated with a service node (e.g., packet switching device) using one or more services applied to packets by an application node (e.g., a packet switching device and/or computing platform). Note, a particular packet having one or more services applied to it by an application node is referred to herein as a services-applied packet, regardless of whether the application of the service(s) resulted in the same particular packet, a modified particular packet, or a different packet. Further, "Service-Wire" is a term used herein to refer to the technology (e.g., equipment, methods, protocols) used in communicating packets to and/or among one or more remote application node(s), the application of one or more services to a packet, and possibly the sending of the services-applied packet and/or other results to a ServiceWire-capable service node. For example, the packet encapsulation or information sent between service node(s) and/or application node(s) might be referred to as ServiceWire encapsulation or ServiceWire attributes.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device. The term "packet" refers to a data packet or frame, such as, but not limited to, an Internet Protocol (IP) packet or Ethernet frame; and the format of a packet includes at least a packet header and payload.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with a service node (e.g., packet switching device) using one or more services applied to a packet by an application node (e.g., a packet switching device and/or computing platform such as a Cisco ASR 1000) to generate a result, which is used by the service node to process packets of a flow of packets to which the packet belonged. In one embodiment, a service applied to a packet is a classification service, such as, but not limited to, using deep packet inspection on the packet to identify a classification result. In one embodiment, the service node uses this classification result to process the packet. In one embodiment, the service node uses this classification result to process the packet and/or other packets in a same packet flow, such that all packets of a flow do not need to be sent to an application node for processing. In one embodiment, multiple packets of a packet flow are sent to an application node(s) for processing, such as, but not limited to, using deep packet inspection to identify one or more classification results which are used to process one or more packets in the packet flow.

Figure 1A:
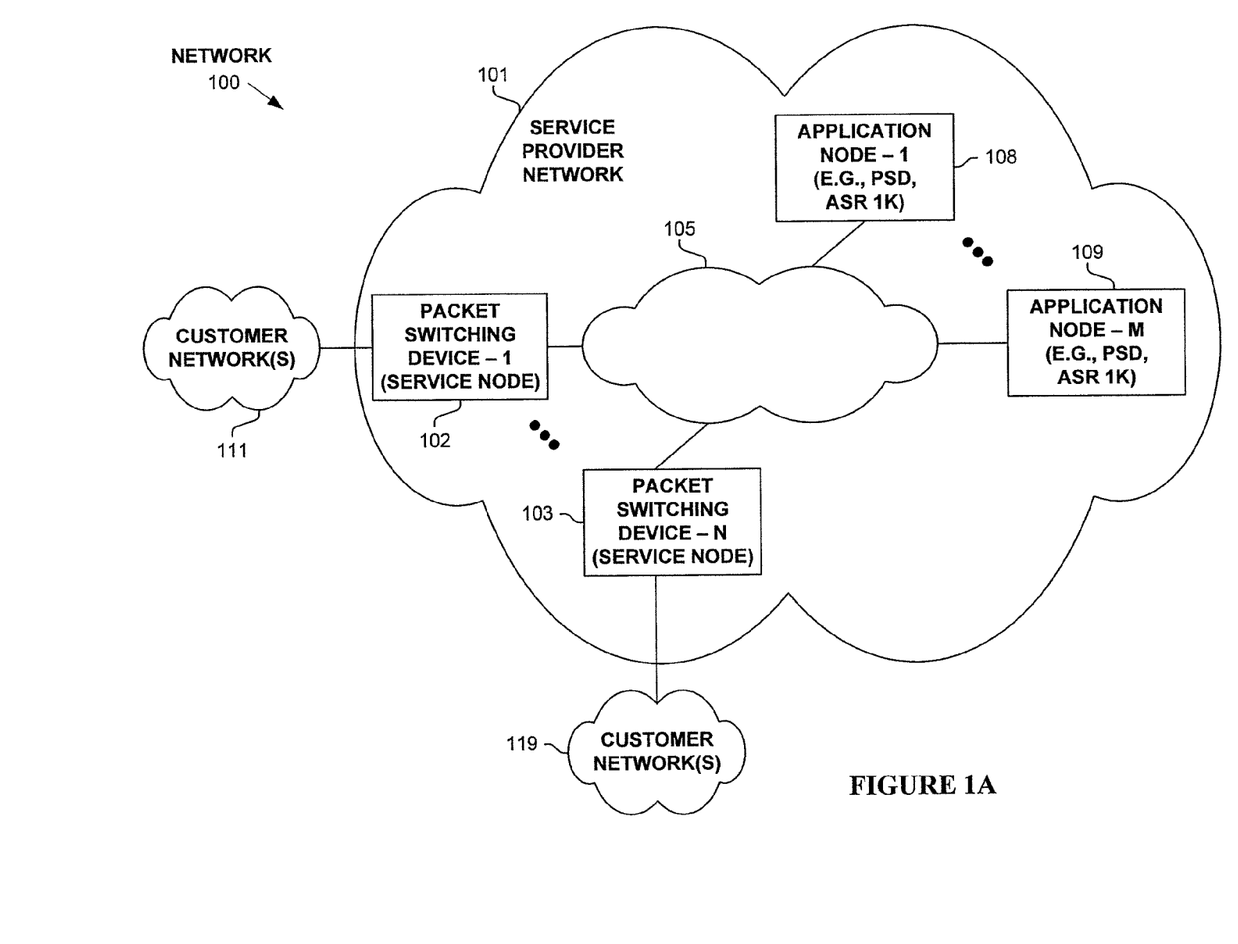
FIG. 1A illustrates a network operating according to one embodiment.

Expressly turning to the figures, FIG. 1A illustrates network 100 operating according to one embodiment, wherein a service node (e.g., packet switching device 102-103) sends a packet to an application node (108-109) for performing one or more services to the packet by one or more application nodes (108-109). Network 100 illustrates a typical configuration of a service provider network 101, which has edge packet switching devices 102-103 communicatively coupled to customer networks 111-119; and within service provider network 101, service provider nodes 102-103 and 108-109 are communicatively coupled (105).

Note, one embodiment performs the operations of sending packets to application node(s) for applying service(s) in one or more networks different than network 100; and one embodiment performs the operations of receiving packets by application node(s) for applying service(s) in one or more networks different than network 100.

As illustrated in FIG. 1A, packet switching devices 102-103 ("service nodes") are configured for sending packets to one or more application nodes 108-109 for applying one or more services to determine a result, with the determined result and typically the services-applied packet being returned to the originating packet switching device (102-103). Thus, packet switching devices 102-103 are not required to be able to perform such service(s). This allows the development of new packet services which are performed by an application node 108-109, without having to integrate into a packet switching device 102-103 (which would typically be more costly in terms of development and testing). Further, it is possible for an application node (108-109) to apply services to one or more of the packets in a packet flow in order to generate a result, with this result then used by a packet switching device (102-103) in processing these and/or other packets in the packet flow. Thus, in one embodiment, only one or possibly a few packets of a flow (e.g., some, but not all packets) are sent to an application node (108-109) to generate a result or results, with these result(s) used in processing other packets in the packet flow.

In one embodiment, the services applied to a packet include a classification service to classify the packet, possibly using deep packet inspection, such as, but not limited to, analyzing the payload of the particular packet, and/or analyzing information, extracted from the packet, corresponding to at least one or more of Open System Interconnect (OSI) layer from the group consisting of layer 5, layer 6 and layer 7. In one embodiment, this classification result is used in processing other packets in a flow of packets to which the classified packet belongs. In one embodiment, this classification or other processing result is used in applying Quality of Service (QoS) to one or more packets of the corresponding packet flow.

Figure 1B:
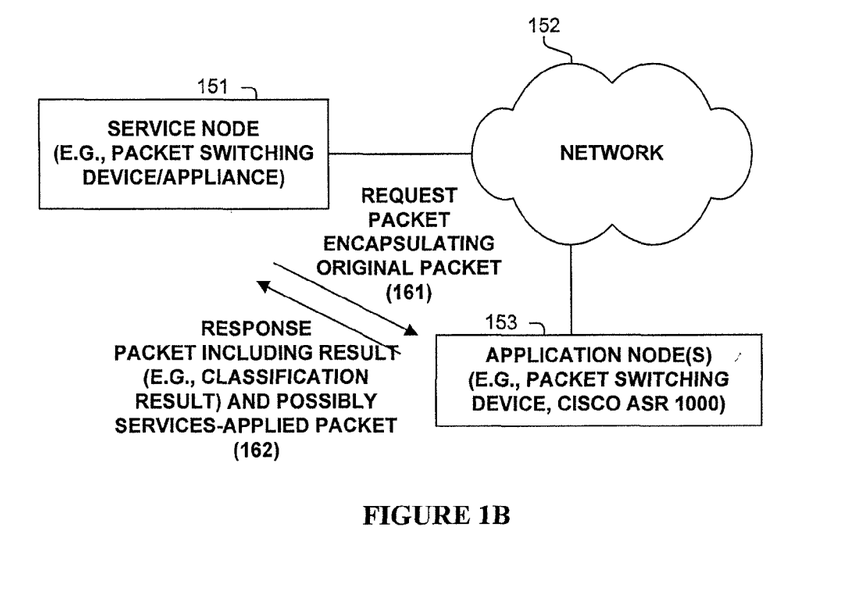
FIG. 1B illustrates a network operating according to one embodiment.

Next, shown in FIG. 1B is a generalized configuration including service node 151 (e.g., packet switching device/appliance), application node(s) 153 (e.g., packet switching device/appliance such as, but not limited to, a Cisco ASR 1000), communicatively coupled via network 152. As shown, service node 151 sends a request packet (161) encapsulating an original packet to application node(s) 153, which applies one or more services to the original packet to determine a result (e.g., classification or other result). A response packet is sent (162) from application node(s) 153 to originating service node 151, with the response packet including the determined result, and possibly the encapsulated services-applied packet (e.g., the result of one or more services being applied to the original packet, which is typically the same, or a modification of, the original packet).

Figure 1C:
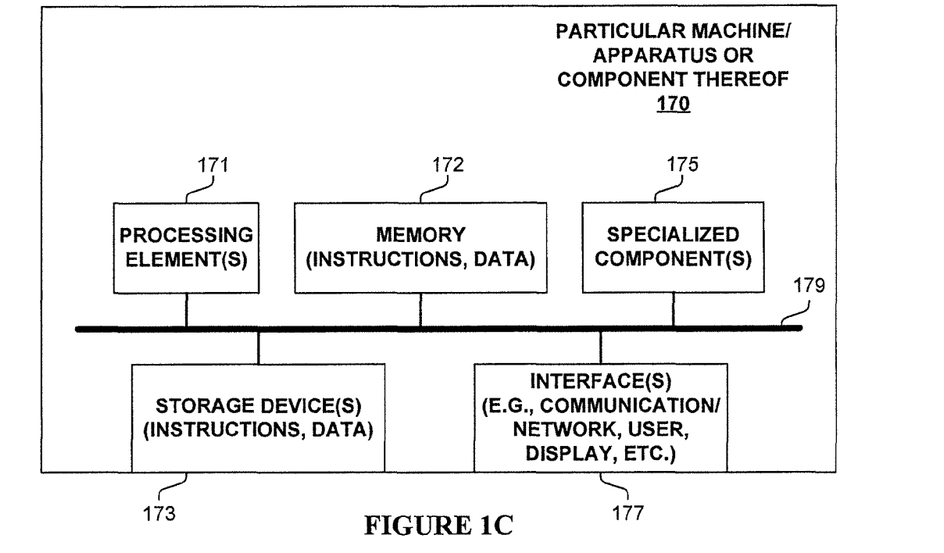
FIG. 1C illustrates an apparatus or component used in one embodiment.

FIG. 1C is a block diagram of an apparatus or component 170 used in one embodiment associated with a service node (e.g., packet switching device) using one or more services applied to packets by an application node (e.g., a packet switching device and/or computing platform). In one embodiment, apparatus or component 170 performs one or more processes corresponding to one of the flow diagrams illustrated or otherwise described herein.

In one embodiment, apparatus or component 170 includes one or more processing element(s) 171, memory 172, storage device(s) 173, specialized component(s) 175 (e.g. optimized hardware such as for performing operations, etc.), and interface(s) 177 for communicating information (e.g., sending and receiving packets, user-interfaces, displaying information, etc.), which are typically communicatively coupled via one or more communications mechanisms 179, with the communications paths typically tailored to meet the needs of the application. In one embodiment apparatus or component 170 corresponds to, or is part of, a service or application node illustrated in one of the other figures or otherwise described herein.

Various embodiments of apparatus or component 170 may include more or less elements. The operation of apparatus or component 170 is typically controlled by processing element(s) 171 using memory 172 and storage device(s) 173 to perform one or more tasks or processes. Memory 172 is one type of computer-readable/computer-storage medium, and typically comprises random access memory (RAM), read only memory (ROM), flash memory, integrated circuits, and/or other memory components. Memory 172 typically stores computer-executable instructions to be executed by processing element(s) 171 and/or data which is manipulated by processing element(s) 171 for implementing functionality in accordance with an embodiment. Storage device(s) 173 are another type of computer-readable medium, and typically comprise solid state storage media, disk drives, diskettes, networked services, tape drives, and other storage devices. Storage device(s) 173 typically store computer-executable instructions to be executed by processing element(s) 171 and/or data which is manipulated by processing element(s) 171 for implementing functionality in accordance with an embodiment.

Figure 2A:
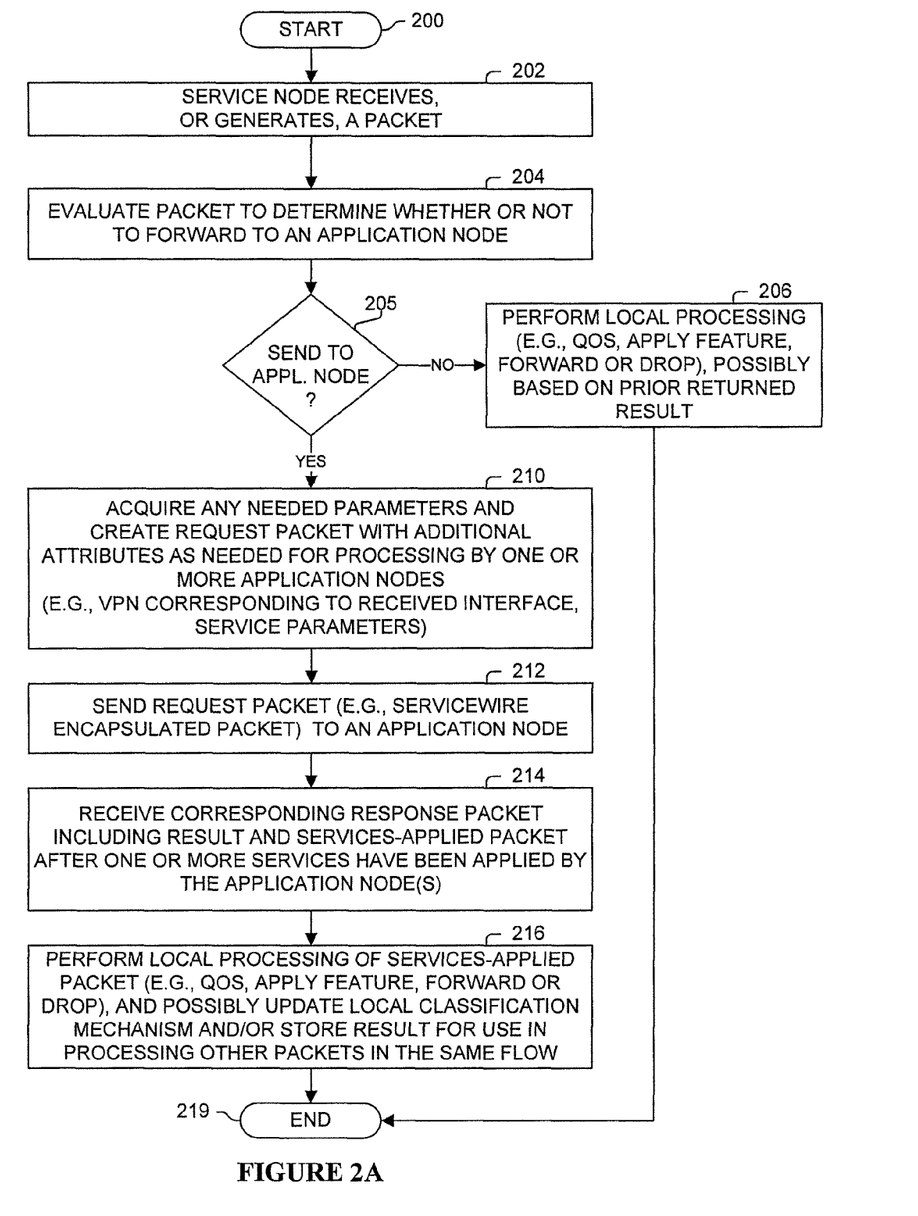
FIG. 2A illustrates a process performed in one embodiment.

FIG. 2A illustrates a process performed in one embodiment by a service node, such as, but not limited to, a packet switching device. Processing begins with process block 200. In process block 202, the service node receives or generates a packet. For example, the packet may be generated by the service node itself, or even by processing of another packet. In process block 204 (assuming it is not already known that the packet should be sent to an application node, e.g., based on a generated packet or all packets being sent to an application node), the packet is evaluated to determine whether or not it should be sent to an application node.

Process block 205 identifies whether or not to send the packet to an application node. In one embodiment, a packet classification mechanism (e.g., binary or ternary content-addressable memory, lookup engine) is used to determine whether or not to forward the packet to an application node. In one embodiment, this classification mechanism is updated in response to a result returned from an application node's processing of another packet in the same packet flow, so that only one or a small number of packets of a flow may be sent to an application node for processing. This may be particularly useful when an application node is performing a classification operation (e.g., for QoS, or even virus or intrusion protection), that after such classification operation is determined for the flow of packets (e.g., based on a subset of the flow of packets), the other packets in the flow of packets are not sent to an application node for processing as how to process these packets has been determined. Thus, the packet classification mechanism may be updated to stop sending packets of the packet flow to an application node.

As identified in process block 205, if the packet should not be sent to an application node, then in process block 206, normal local processing of the packet is performed (e.g., QoS processing, apply one or more features, forward or drop, etc.), possibly based on a result from processing by an application node of one or more packets in a same packet flow.

Otherwise processing proceeds to process block 210, as process block 205 identified that the packet is to be sent to an application node for applying one or more classifications of Layer-4 to Layer-7 services by one or more application nodes to the packet to determine a result. Note, the use of the phrase "applying one or more services to the packet" includes a series of applications applied to the packet, with the packet possibly being modified between the application of some of these services such that one or more of the services is applied to a modified original packet. Further, examples of these Layer-4 to Layer-7 services include, but are not limited to, Firewall (FW), Network Address Translation (NAT), Network-based Application Recognition (NBAR), authentication, encryption and Internet Protocol Security (IPsec).

In process block 210, any parameters (e.g., VPN identification, specialized service parameters, label stacks, etc.) are acquired, and the request packet is created. The request packet includes the original packet, and possibly other ServiceWire attributes, such as, but not limited to: an identification of one or more services to be applied to the packet, an identification of a virtual private network (VPN) associated with the packet (e.g., a VPN associated with an interface on which the packet was received), etc. In one embodiment, the service identification is a single value, for example, indicating to perform QoS classification on the packet. In one embodiment, the service identification includes the identification of a generalized service (e.g., Firewall) and a specific service of the generalized service (e.g., inside-to-outside, outside-to-inside). Next, in process block 212, the request packet (e.g., a ServiceWire packet encapsulating the original packet) is sent to an application node. In process block 214, a response packet, corresponding to the sent request packet, is received, with the response packet including a result of the application of one or more services. In one embodiment, this result is a classification result based on one or more classification operations performed on the original packet. Additionally, typically the result packet also encapsulates the services-applied packet corresponding to the original packet (i.e., the result of one or more services being applied to the original packet by one or more application nodes). In process block 216, the service node processes the services-applied packet, typically based on the result (e.g., classification result such as a QoS indication for processing one or more packets of a flow of packets). Examples of such processing include, but are not limited to: the service node applies QoS to one or more packets of a flow of packets, the service node applies one or more additional services to the services-applied packet; the service node forwards or drops the services-applied packet; the service node performs a lookup operation in the corresponding forwarding information for the VPN identified in the response packet from multiple sets of forwarding information maintained for different VPNs; repeat the process illustrated in FIG. 2A by returning to process block 204, etc.

Additionally, as discussed supra, the classification mechanism (e.g., the processing by process block 205) might be updated to no longer send packets of a same packet flow to an application node.

Processing of the flow diagram of FIG. 2A is complete as represented by process block 219.

Figure 2B:
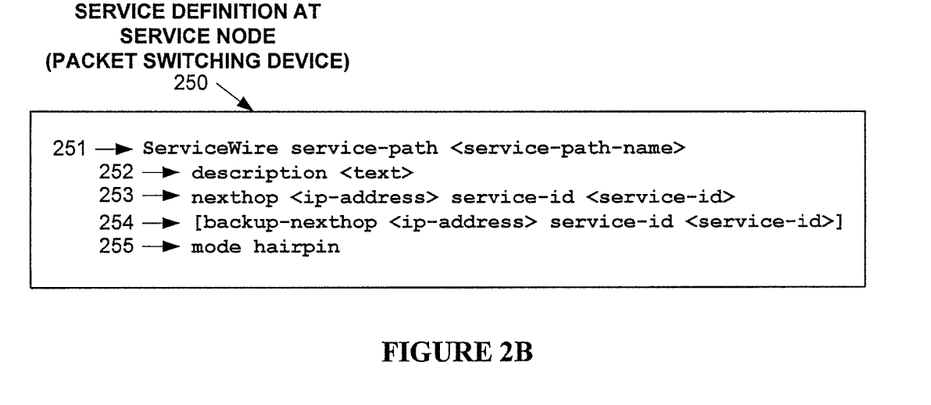
FIG. 2B illustrates a configuration process performed in one embodiment.

FIG. 2B illustrates a command 250, used in one embodiment, for configuring the service definition in a service node. As shown, command 250 includes:
- a user-defined name of the ServiceWire service (251);
- a user description/comment (252);
- application node definition (253) including the address of the application node to which to send a packet as well as the identification of the service(s) to be applied (e.g., which may be a specific service, or a generalized service and one or more values to define a specific service of the generalized service);
- backup application node definition (254); and
- mode hairpin (255) defining that the one or more application nodes will return a response packet including the services applied packet to the originating service node.

Figure 2C:
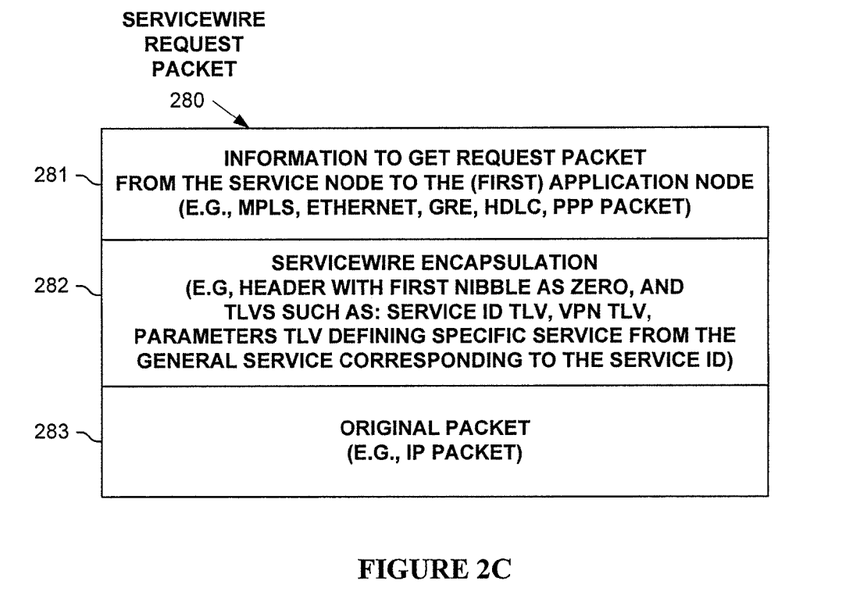
FIG. 2C illustrates a packet format used in one embodiment.

Next, FIG. 2C illustrates a ServiceWire request packet (280) used in one embodiment. As shown, request packet 280 encapsulates original packet 283, which is to have one or more services applied to it by one or more application nodes. In one embodiment, request packet 280 comprises one or more fields 281, which includes information to get the request packet from the service node to the first application node of one or more application nodes. The format of request packet 280 may be in one of an extensible number of formats, such as, but not limited to, MPLS, Ethernet, GRE, HDLC, PPP, etc., with one or more fields 281 conforming to the particular packet format. ServiceWire encapsulation 282 includes information required for defining the one or more applications to be applied to original packet 283, as well as possibly additional information (e.g., VPN information to be returned to the service node so it can properly forward a packet). In one embodiment such as when field 281 includes an MPLS label stack, field 282 has its first nibble as zero to identify ServiceWire encapsulation follows, when normally the first nibble would be four or six to identify an IPv4 or IPv6 packet is encapsulated. In one embodiment, ServiceWire encapsulation 282 encodes the ServiceWire information (e.g., identification of a service, identification of general and specific services, VPN information, etc.) in one or more Type-Length-Value (TLV) structures.

Figure 3A:
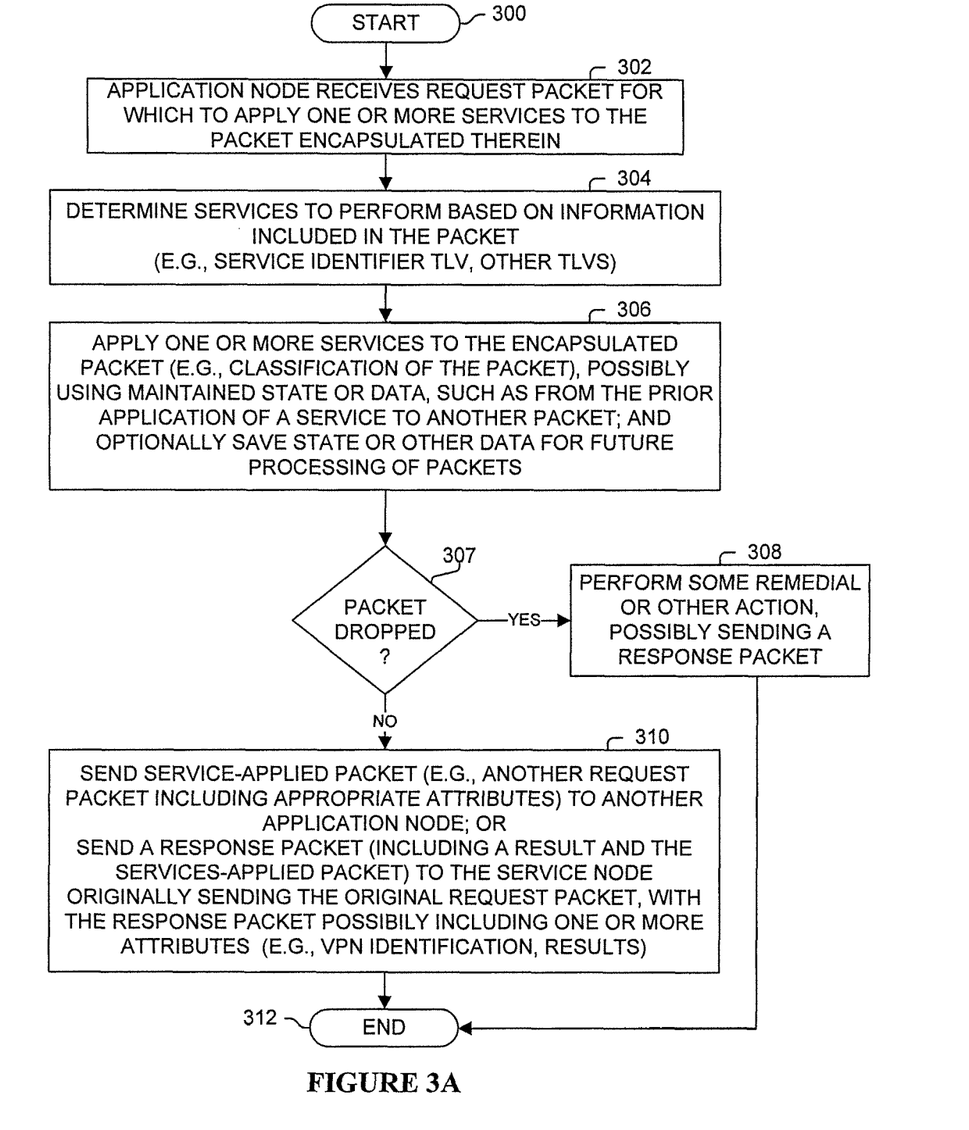
FIG. 3A illustrates a process performed in one embodiment.

FIG. 3A illustrates a process performed, in one embodiment, by an application node for processing a request packet received from a service or application node. Processing begins with process block 300. In process block 302, the application node receives the request packet for which to apply one or more services to the packet encapsulated therein. Typically, the application node is remote from the service node (e.g., communicatively coupled via a network external to the service and application nodes). In one embodiment, the service and application nodes are within a same packet switching appliance, such as with the application node being a blade server. Next, in process block 304, the application node identifies, based on information included in the request packet (e.g., in the ServiceWire encapsulation) one or more services to apply to the encapsulated packet.

In process block 306, the application node applies one or more of the identified service(s) to the encapsulated packet. In one embodiment, these services include a classification service such as using deep packet inspection of the encapsulated packet, generating a classification result which can be used in processing the packet and possibly other packets in the same flow of packets. For example, this classification result might identify a QoS level for processing packets in the flow of packets, or it might identify that the flow of packets should be dropped (e.g., they are malicious in nature).

Additionally, in one embodiment, resulting state information or other data from the application of a service to a packet of a packet flow may be maintained by an application node, such as for use in applying a service to other packets especially those of a same packet flow, or for collecting data or statistics, etc. For example, in analyzing a flow of packets (e.g., applying a deep packet inspection service), certain signature or other data may be split among multiple packets of the packet flow. Thus, to appropriately classify the flow, an analysis/classification service is applied to multiple packets of the flow, with the particular classification of the packet flow not known until the last of these multiple packets have been analyzed. In one embodiment, a service or an application node uses this particular classification to process other packets in the packet flow. Note, these packets, after having one or more services applied to them, can be sent to another application node, to a service node, or dropped.

As determined in process block 307, if the packet was dropped, then in process block 308, some remedial or other action is typically taken, which may include sending a response packet to the service node, such that the service node can update its classification mechanism to no longer forward packets of the corresponding packet flow to an application node, and to update its processing of other packets of the corresponding packet flow (e.g., drop or mark for dropping, or other processing).

Otherwise, in process block 310, the services-applied packet (e.g., the original packet or a modification thereof based on the application of one or more services) is sent in a request packet to another application node to apply one or more services; or the services-applied packet along with a result (e.g., classification or other processing result) is sent in a response packet back to the originating service node. For example, one application node can apply one or more services (e.g., including deep packet inspection) to a packet, with the packet and these results sent to another application node for applying one or more services. The response packet may include one or more attributes or other information, such as, but not limited to, a classification or processing result and/or an identification of a VPN associated with the services-applied packet (e.g., the same or different identifier identifying a VPN in the ServiceWire or other encapsulation of the received request packet).

Processing of the flow diagram of FIG. 3A is complete as indicated by process block 312.

Figure 3B:
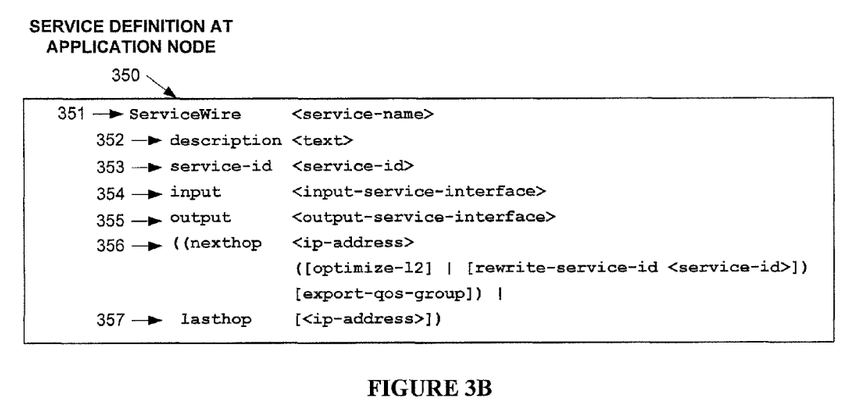
FIG. 3B illustrates a configuration process performed in one embodiment.

FIG. 3B illustrates a command 350, used in one embodiment, for configuring the service definition in an application node. As shown, command 350 includes:
a user-defined name of the ServiceWire service (351);
a user-defined description/comment (352);
identification (353) of the service(s) to be applied (e.g., which may be a specific service, or a generalized service and one or more values to define a specific service of the generalized service), which corresponds to the service identification in service node definition (253) in FIG. 2B;
features (354) of the one or more services to be applied at an input-service-interface;
features (355) of the one or more services to be applied at an output-service-interface; and
optional forwarding information (356). If not included, a response packet will be created and sent to the originating service node. Otherwise, the nexthop keyword indicates a next application node in the service path (this is the service chaining case where the one or more services are applied by multiple application nodes). The optimize-l2 keyword enables a forwarding optimization for traffic received on native transport connections. When optimize-l2 is configured, an optimized forwarding mechanism that increases packet throughput is used for traffic received on native transport connections. The optimized forwarding mechanism is: swap the source and destination MAC addresses in the packet, and forward the packet back out the interface that it was received on. When the optional rewrite-service-id keyword is configured, the application node will use this as the identification (353) of the service to be applied by the next application node. When the optional export-qos-group keyword is configured, a qos-group value is included (e.g., in a TLV) in a packet sent from the application node, with this value typically used to set a QoS value in a packet switching system.

In one embodiment, when an application node sends a packet to another application node for applying additional services of the one or more services to be applied to a packet, it sends a request packet 280 of FIG. 2C to the next application node.

Figure 3C:
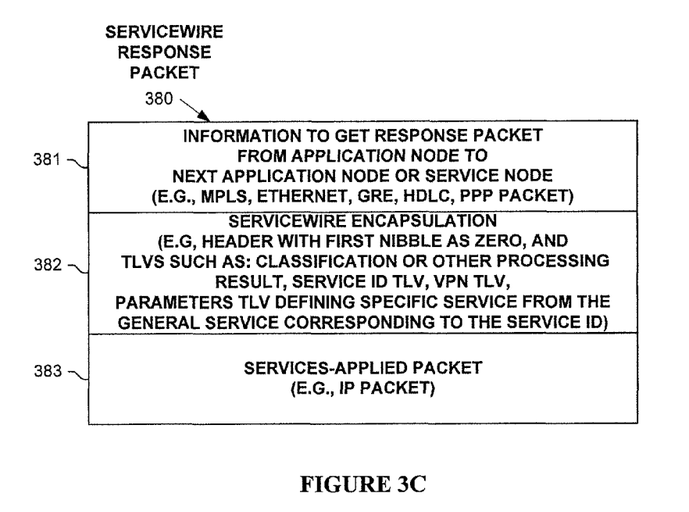
FIG. 3C illustrates a packet format used in one embodiment.

The following passage, before the description of FIG. 3C, describes the operation of one embodiment configured using one or more of the keywords.

After one or more services are applied to a packet by one or more application nodes, the services-applied packet is forwarded from an application node. In one embodiment, packet forwarding is controlled by the nexthop 356 or lasthop keyword 357 (one of these two keywords is always configured in one embodiment).

The nexthop keyword 356 indicates that the packet should be forwarded toward the configured ip-address using the ServiceWire data-plane encapsulations. The specified nexthop ip-address may be an IP address defined on:
The originating service node (this is the typical "hairpin" case where the services-applied packet is returned to the originating service node after one or more services have been applied to the original packet—in contrast to the "non-hairpin" case where the services-applied packet is not returned to the originating service node); or
The next application node in the service path (this is the service chaining case where multiple different application nodes are used to apply multiple services to the original packet).

When the nexthop keyword 356 is specified, the ServiceWire data-plane encapsulations are used when forwarding packets that have been serviced. When an ip-address is configured in conjunction with the nexthop keyword 356, the application node uses a routing table to forward the packet.

When the optional rewrite-service-id keyword is configured, the application node rewrites the service ID that is included in the ServiceWire data-plane encapsulation of the forwarded packet to the specified value. The rewrite-service-id keyword is typically used in conjunction with service chaining, wherein a packet is forwarded from one application node to another application node for applying one or more additional services.

The export-qos-group keyword is an optional parameter that enables exporting of a qos-group value set during service execution. If the export-qos-group parameter is not specified, then no qos-group value will be exported for the service. If the export-qos-group parameter is specified, and a set qos-group command is executed as part of service execution, then the qos-group value will be exported. A qos-group value is exported by including the value in the ServiceWire packet headers. The export-qos-group parameter is primarily intended for use in conjunction with the NBAR service (e.g., deep packet inspection), but can also be used independently from NBAR. Note, the result of the NBAR or other deep packet inspection service can be returned in another field, such as in a general result TLV.

The lasthop keyword 357 indicates that the packet is to exit the ServiceWire domain, and return to the normal (e.g., IP, MPLS) routing domain, after the service is executed. Thus, if the lasthop keyword 357 is specified, the ServiceWire data-plane encapsulations are not used when forwarding packets after service execution.

If the lasthop keyword 357 is not specified and a BGP Next Hop TLV [e.g., the address of a packet switching device to which to send the services-applied packet, with the BGP Next Hop TLV being typically determined by the originating service node by performing a lookup operation in its routing table (e.g., that derived from an external routing protocol such as BGP) on the destination address of the original packet] is present in the ServiceWire data-plane encapsulation of a packet:

the contents of the BGP Next Hop TLV are ignored by the application node, and     the BGP Next Hop TLV is included in the ServiceWire header of the packet when it is forwarded by the application node.

When the optional ip-address parameter is configured in conjunction with the lasthop keyword 357, the application node forwards the packet toward the configured ip-address using the routing table. A primary motivation for this mode is support for forwarding to packet switching devices that do not support ServiceWire. This mode is a specialized form of the topology-independent, non-hairpin deployment model (where the application does not run BGP, for example, and the services-applied packet is not to be sent back to the original service node). If this mode is configured and a BGP Next Hop TLV is present in the ServiceWire data-plane encapsulation of a packet, the contents of the BGP Next Hop TLV are ignored by the application node.

If the lasthop keyword 357 is specified without the optional ip-address parameter, packet forwarding may be performed in accordance with the topology-independent deployment model or the topology-aware deployment model. Forwarding is performed in accordance with the topology-independent model when a BGP Next Hop TLV is present in the Service-Wire data-plane encapsulation of a packet. Forwarding is performed in accordance with the topology-aware model when the ServiceWire data-plane encapsulation of the packet does not contain a BGP Next Hop TLV (e.g., the application node performs a lookup operation on the destination address of the services-applied packet to determine how to forward the services-applied packet).

In the topology-aware model, the packet is forwarded toward the destination IP address in packet's IP header.

In the topology-independent model, packet forwarding is based on information in the BGP Next Hop TLV (e.g., the address of a packet switching device to which to send the services-applied packet, with this BGP Next Hop TLV being typically determined by the originating service node by performing a lookup operation in its routing table (e.g., that derived from an external routing protocol such as BGP) on the destination address of the original packet).

The last application node in the service path uses the contents of the BGP Next Hop TLV for forwarding when the service is configured using the lasthop keyword 357. This operation in one embodiment is as follows:

The application node does a lookup in the forwarding information base (FIB) for the IPv4 address of the BGP Next Hop (and not on the destination address of the services-applied packet). The FIB is typically generated based on running an Interior Gateway Protocol (IGP) such as, but not limited to, Intermediate system to Intermediate System (IS-IS) or Open Shortest Path First (OSPF). Note, the application node does not need to run an exterior network protocol (e.g., BGP) because the BGP Next Hop value is that of a packet switching device in a provider's network; hence, the application node does not need to know how to route to the destination address of the packet (or all of the other addresses in the Internet).

If this lookup fails to return a route, the services-applied packet is dropped (or possibly other remedial action taken, such as returned to the originating service node, or sending the packet to another packet switching device or service node).

If the route is not over a Multiprotocol Label Switching Label Switched Path (MPLS LSP):

the services-applied packet is forwarded according to the route without any ServiceWire encapsulation, and any MPLS labels provided in the request packet (e.g., in a TLV) are ignored.

If the route is over a MPLS LSP and the BGP Next HOP TLV does not contain any labels, then the services-applied packet is forwarded according to the route without any ServiceWire encapsulation.

If the route is over a MPLS LSP and the BGP Next HOP TLV contains a label stack:

the label stack from the BGP Next HOP TLV is pushed onto the services-applied packet as the bottom entries of the label stack,     the transport labels for the MPLS LSP are then pushed onto the services-applied packet as the top entries of the label stack, and     the services-applied packet is forwarded without any ServiceWire data-plane encapsulation.

Next, FIG. 3C illustrates a ServiceWire response packet (380) used in one embodiment. As shown, response packet 380 encapsulates the services-applied packet 383, which is the original packet after having the one or more services applied to it by one or more application nodes. Thus, services-applied packet 383 packet can be the original packet, or a modification thereof resulting from the application of these services.

In one embodiment, response packet 380 comprises one or more fields 381, which includes information to get the response packet from the application node to the service node. The format of response packet 380 may be in one of an extensible number of formats, such as, but not limited to, MPLS, Ethernet, GRE, HDLC, PPP, etc., with one or more fields 381 conforming to the particular packet format. ServiceWire encapsulation 382 includes information for use by the service node in processing encapsulated services-applied packet 383 and/or other packets in a same packet flow (e.g., classification or other processing result, VPN information so the service node can properly forward services-applied packet 383). In one embodiment such as when field 381 includes an MPLS label stack, field 382 has its first nibble as zero to identify ServiceWire encapsulation follows, when normally the first nibble would be four or six to identify an IPv4 or IPv6 packet is encapsulated. In one embodiment, ServiceWire encapsulation 382 encodes the ServiceWire information (e.g., identification of a service, identification of general and specific services, VPN information, etc.) in one or more Type-Length-Value (TLV) structures.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
    creating, by a packet switching device, a request packet corresponding to a particular packet of a flow of packets, with the flow of packets including: a particular packet and a plurality of other packets, wherein the flow of packets is a sequence of related packets;
    sending, by the packet switching device, the request packet to an application node of one or more application nodes remote from the packet switching device, wherein the request packet including the particular packet;
    applying one or more services, by said one or more application nodes, to the particular packet to generate a particular result;
    receiving, by the packet switching device, a response packet including the particular result, with the response packet corresponding to said sent request packet; and
    processing, by the packet switching device, the particular packet and each packet of the plurality of other packets according to the particular result, without the plurality of other packets being sent to one or more application nodes prior to said processing of the plurality of other packets.

2. The method of claim 1, wherein said one or more services includes a classification operation using deep packet inspection of the particular packet to produce a classification result; and wherein the particular result includes the classification result.

3. The method of claim 2, wherein said deep packet inspection includes analyzing the payload of the particular packet.

4. The method of claim 3, where said deep packet inspection includes analyzing information, extracted from the particular packet, corresponding to at least one or more of Open System Interconnect (OSI) layers from the group consisting of layer 5, layer 6 and layer 7.

5. The method of claim 2, wherein the classification result identifies a particular Quality of Service (QoS).

6. The method of claim 1, wherein the request packet includes a service identification of at least one service of one or more services to be applied to the particular packet by one or more application nodes.

7. A packet switching device, comprising:
    an ingress interface of a plurality of interfaces configured to receive a flow of packets from an external device, with the flow of packets including: a particular packet and a plurality of other packets, wherein the flow of packets is a sequence of related packets;
    a packet processor configured to create a request packet corresponding to the particular packet, wherein the request packet including the particular packet; and
    a second interface of the plurality of interfaces configured to send the request packet to an application node of one or more application nodes, remote from the packet switching device, for applying one or more services to the particular packet by said one or more application nodes to generate a particular result;
    wherein the packet switching device is configured to receive a response packet, corresponding to said sent request packet, on one of the plurality of interfaces, with the response packet including the particular result; and
    wherein the packet switching device is configured to process the particular packet and each packet of the plurality of other packets according to the particular result, without the plurality of other packets being sent to one or more application nodes prior to said processing of the plurality of other packets.

8. The packet switching device of claim 7, wherein said one or more services includes a classification operation using deep packet inspection of the particular packet to produce a classification result; and wherein the particular result includes the classification result.

9. The packet switching device of claim 8, wherein said deep packet inspection includes analyzing the payload of the particular packet.

10. The packet switching device of claim 9, where said deep packet inspection includes analyzing information, extracted from the particular packet, corresponding to at least one or more of Open System Interconnect (OSI) layers from the group consisting of layer 5, layer 6 and layer 7.

* * * * *